United States Patent [19]

Kloster

[11] 4,036,473
[45] July 19, 1977

[54] SPRING COMPRESSOR TOOL

[76] Inventor: Kenneth Donald Kloster, 5153 Rambo Lane, Toledo, Ohio 43623

[21] Appl. No.: 680,178

[22] Filed: Apr. 26, 1976

Related U.S. Application Data

[63] Continuation of Ser. No. 547,918, Feb. 7, 1975, abandoned.

[51] Int. Cl.² ............................................. B23P 19/04
[52] U.S. Cl. ........................................ 254/10.5; 29/227
[58] Field of Search ............................ 254/10.5, 93 R; 29/215–218, 225–227, 252

[56] References Cited

U.S. PATENT DOCUMENTS

| 1,342,529 | 6/1920 | Charland | 254/10.5 |
|---|---|---|---|
| 2,947,275 | 8/1960 | Edmonds | 254/93 R |
| 3,150,859 | 9/1964 | Payne | 29/252 |
| 3,224,730 | 12/1965 | Fischler | 254/10.5 |
| 3,256,594 | 6/1966 | Howard et al. | 29/227 |
| 3,679,178 | 2/1970 | Lodynski | 254/93 R |
| 3,764,107 | 10/1973 | Mlynarczyk | 29/227 |
| 3,814,382 | 6/1974 | Castoe | 254/10.5 |

Primary Examiner—Al Lawrence Smith
Assistant Examiner—Robert C. Watson
Attorney, Agent, or Firm—Richard D. Emch

[57] ABSTRACT

A spring compressor tool is disclosed for use on, for example, the independent suspension assembly of a vehicle, without the necessity of removing the suspension from the vehicle. The tool includes upper and lower U-shaped pressure shoes having helical-shaped outer peripheries for receiving spaced coils of the spring intermediate the opposed connected ends of the spring. A pair of pneumatic cylinders are positioned between the upper and lower shoes. Cylinder rods extend within the cylinders and mount pistons at one end. A header assembly includes pressurizing and venting valves and the cylinder rods define air passageways which communicate with the header assembly and with the cylinders. Return springs are provided adjacent the rods to urge the shoes to a non-compressed position. Air pressure is provided through the passageways to move the shoes toward one another to compress the suspension assembly spring.

10 Claims, 3 Drawing Figures

U.S. Patent
July 19, 1977
4,036,473
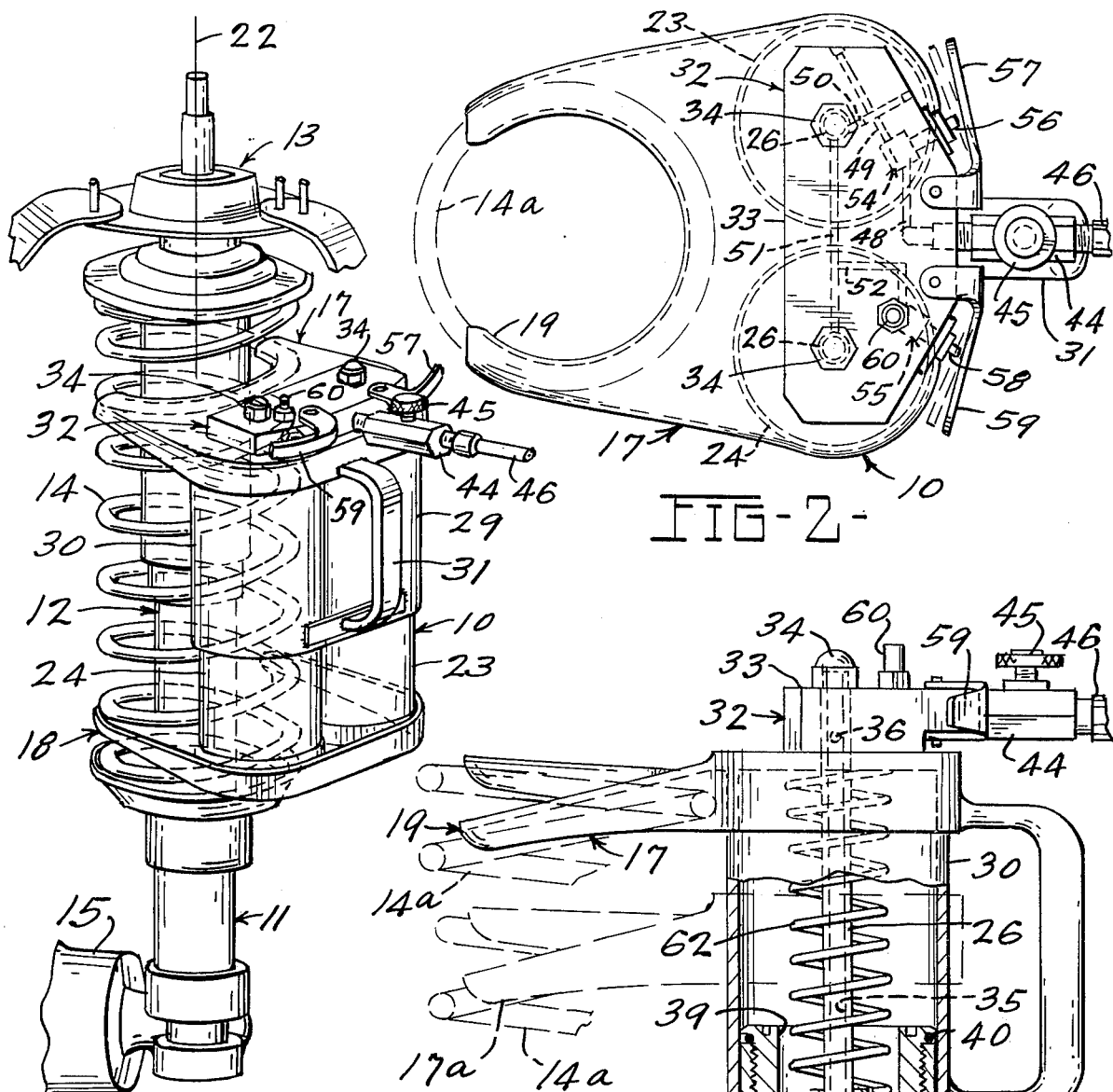
FIG-1-
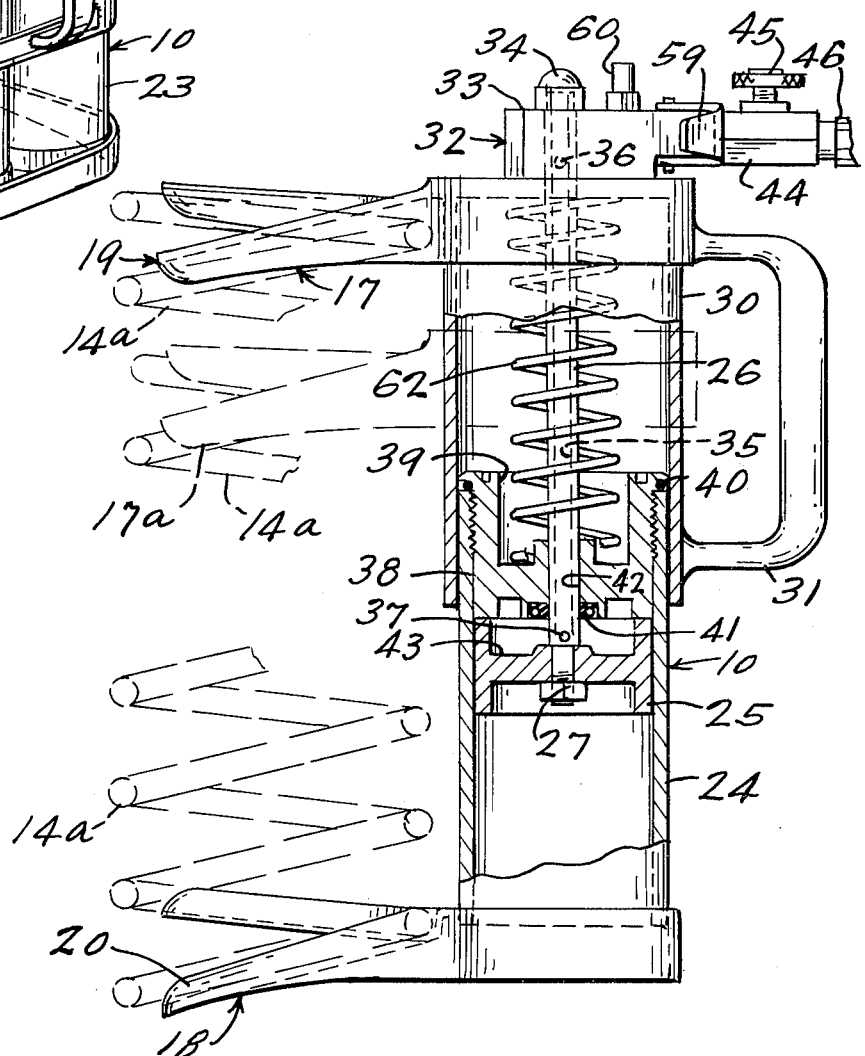
FIG-2-
FIG-3-

SPRING COMPRESSOR TOOL

This is a continuation, of application Ser. No. 547,918 filed Feb. 7, 1975, now abandoned.

BACKGROUND OF THE INVENTION

The need for a tool to compress heavy coil springs is well known in the art. The need for such tools has become even more important since more and more vehicles having independent suspensions are now in use. Many of these vehicles use a McPherson type strut suspension which is particularly popular on imported vehicle because of its space saving attributes. The heavy coil springs are compressed and support a substantial part of the vehicle weight. In the after market, the independent suspensions must be serviced, particularly the shock absorber cylinder which in the MacPherson type independent suspension is located within the heavy coil spring. Often a frame hoist is used, but even when the supporting members engaged by the spring are spaced apart at their maximum distance, the heavy coil spring is often still under a load and must be compressed still further before it can be removed. Mechanical linkages have been used in the prior art to compress the heavy springs, for example the type shown in U.S. PaT. No. 1,342,529. However, many of these prior art tools have been clumsy to use and relatively inefficient.

More recently, bench type tools, for example the spring compressor shown in U.S. Pat. No. 3,814,382, have been introduced to the marketplace. However, to remove the coil spring from a vehicle and then to insert it into a bench type tool is time consuming. Manual spring compressors are often used in the initial operation. Because the heavy duty springs are helical in configuration and under load, it is not unusual for the manual tool to slip from the engaged coils of the spring.

SUMMARY OF THE INVENTION

The present invention is directed to a spring compressor tool which is used in situ. Because the tool compresses the spring in place allowing, for example, the MacPherson type cartridge to then be removed and serviced, the overall garage or servicing operation is reduced substantially over that known in most prior art tools.

The present spring compressor tool includes upper and lower pressure shoes which in a preferred embodiment define generally U-shaped helical outer peripheries for receiving a coil of a loaded spring at positions intermediate the opposed and connected ends of the spring. The design of the shoes places the load or force in a direction parallel with the longitudinal axis of the spring even though the load applying shoes are acting on the helical surfaces of spaced coils of the spring. Cylinder means are connected between the upper and lower pressure shoes and the cylinder rod has a longitudinal passageway which is in communication with a header assembly. The header assembly directs air downwardly through the rod passageway into the cylinder. This drives the upper and lower shoes toward one another and compresses the heavy coil spring. The header assembly includes a vent valve which exhausts the cylinder to atmosphere and a return spring assembly repositions the upper and lower shoes to their non-compressed position.

In a preferred embodiment of the present invention, a pair of cylinders are utilized. The action of the pair of cylinders aids in preventing torquing of the upper and lower shoes and helps to insure that the force is applied parallel to the longitudinal axis of the spring.

BRIEF DESCRIPTION OF THE DRAWINGS

FIG. 1 is a perspective view, partially diagrammatic, showing a spring compressor tool, according to the present invention, being used to compress the spring of a MacPherson type suspension;

FIG. 2 is a top plan view of the spring compressor tool shown in FIG. 1 and indicating the air passageway system in dashed lines; and FIG. 3 is an enlarged elevational view, partially in cross section, showing the spring compressor tool of FIG. 1.

DESCRIPTION OF THE PREFERRED EMBODIMENTS

A spring compressor tool, according to the present invention, is generally indicated in the drawings by the reference number 10. A MacPherson type strut assembly is generally indicated in FIG. 1 by the reference number 11. The strut assembly 11 may include, for example, a cylinder 12, an upper mounting assembly 13 and a heavy coil spring 14. The strut assembly 11 is normally connected to, for example, a lower control arm 15.

The spring compressor tool 10 includes an upper pressure shoe 17 and a lower pressure shoe 18. The shoes may be of differing spring receiving configurations, however in a preferred embodiment, both the shoes 17 and 18 are generally U-shaped and define helical outer peripheries 19 and 20, respectively, which are suitable to receive spaced coils of the coil spring 14. Referring to FIGS. 2 and 3, it is noted that in plan view, the helical outer periphery 19 defines a circular configuration which has the same planar radius as the coil spring 14 while in the elevational view, it is noted that the helical configuration of the periphery 19 provides a close engagement with the coil of the spring 14 which is indicated in dashed lines by the reference number 14a. The same is true with respect to the helical outer periphery 20. The configuration of the upper and lower pressure shoes 17 and 18 insures that the force applied by the pressure shoes 17 and 18 is in a direction parallel to the longitudinal centerline of the coil spring 14, indicated by the reference number 22 in FIG. 1.

One or more cylinders are positioned between the shoes 17 and 18. The positioning of the cylinder between the two shoes 17 and 18 has been found to be advantageous. In the present embodiment a pair of cylinders 23 and 24 are mounted on the lower pressure shoe 18. A piston 25 is provided in each of the cylinders 23 and 24 and a piston rod 26 is connected by a nut 27 to the piston 25. Cup-shaped sleeves 29 and 30 are telescoped over the cylinders 23 and 24, respectively, and mount the upper pressure shoes 17 at their upper ends. In the present embodiment, a handle 31 is mounted on the sleeves 29 and 30 and on the upper pressure shoe 17 and serves as a carrying handle for the spring compressor tool 10. In one embodiment (not shown), the air valving controls are positioned within and on the handle 31.

A header assembly, generally indicated by the reference number 32, includes a header block 33 which is mounted on the upper pressure shoe 17. The upper ends of the piston rods 25 extend through the pressure shoe 17 and the header block 33 and are secured by nuts 34. A longitudinally extending air passageway 35 extends through each of the piston rods 26 and includes an upper opening 36 adjacent the header block 33 and a lower opening 37 adjacent the piston 25.

Referring to FIG. 3, a cylinder cap 38 having a cup-shaped recess 39 is threadably fixed to the upper end of each of the cylinders 23 and 24. Preferably, pneumatic seals 40 are provided between the cylinders 23 and 24 and their respective caps 38. Similarly, pneumatic seals 41 are preferably provided between the caps 38 and the cylinder rods 26 adjacent a central bore 42 which is defined by the caps 38 and which receive the piston rods 26.

A cylinder chamber 43 is defined in each cylinder 23 and 24 between its respective piston 25 and cylinder cap 38.

The header assembly 32 includes an inlet fitting 44 and an air regulator valve 45. The fitting 44 is in communication with a source of air pressure, for example, an air hose 46. The inlet fitting 44 is threadably engaged in the header block 33. The header block 33 defines a series of air passageways, indicated by the reference numbers 48, 49, 50, 51 and 52 in FIG. 2. The header block 33 also receives a pair of valve assemblies, generally referred to by the reference numbers 54 and 55. The valve assemblies 54 and 55 are pneumatic valves, known in the art. The valve assembly 54 includes a valve actuator 56 and a valve arm 57 which is pivotally mounted on the header block assembly 33 in engaging relationship with the valve actuator 56. Similarly, the valve assembly 55 includes a valve actuator 58 and a valve arm 59. The valve assemblies 54 and 55 are normally closed and are opened upon the depression of their respective valve arms 57 and 59. A vent fitting 60 is mounted on the header block 33 and is in communication with the air passageway 52.

To use the spring compressor tool 10, the upper and lower pressure shoes 17 and 18 are moved into position so that their respective helical outer peripheries 19 and 20 engage spaced ones of the coils of a loaded coil spring. In other words, it is not necessary to use manual spring compressors initially as is true with, for example, the spring compressor tool shown in U.S. Pat. No. 3,814,382, mentioned above.

It is important that the helical outer peripheries 19 and 20 snugly engage the individual coils so that the first application is parallel to the longitudinal centerline 22 of the coil spring 14, as discussed above. The valve 45 is opened and fluid under pressure passes into the passageway 48. The valve assembly 54 is moved to an open condition by depressing the valve arm 57 which engages the valve actuator 56. This allows the fluid under pressure to enter the passageway 50, the passageway 51 and both of the longitudinally extending air passages 35 located in the piston rods 26. The passages 50 and 51 are in direct communication with the upper openings 36 defined in the piston rods 26. Fluid under pressure then enters the respective cylinder chambers 33. A return spring 62 surrounds each of the piston rods 26 and is positioned between the top of the cup-shaped sleeves 29 and 30 and the respective cup-shaped recesses defined in the cylinder caps 38.

The fluid pressure entering the cylinder chambers 43 urges the pistons 25 downwardly in their respective cylinders 23 and 24 against the force of the return springs 62. This moves the upper shoe 17 from its non-compressed position indicated in solid lines in FIG. 3, to its compressed position indicated by the dashed lines in FIG. 3. This, of course, compresses the heavy coil spring 14. The mechanic may now quickly and safely remove the upper mounting assembly 13 of the strut assembly 11 and the other related components to, for example, service or replace the MacPherson type cylinder 12.

The mechanic determines the travel of the shoes 17 and 18 by the length of time in which he depresses the valve arm 57. It has been found that the time required to disassemble the strut assembly 11 has been reduced from approximately 30 minutes to approximately 5 minutes by using the tool 10.

To return the spring compressor tool 10 to its uncompressed position, indicated by solid lines in FIG. 3, the mechanic depresses the valve arm 59. This in turn operates the valve actuator 58 and places the valve assembly 55 in an open condition. The valve assembly 55 is in communication with the vent opening 60 and the entire system is vented to atmosphere through the passageway 52, the valve assembly 55 and the vent fitting 60. Upon venting to atmosphere, the return springs 62 urge the cup-shaped sleeves 29 and 30 upwardly and the shoes 17 and 18 are returned to their uncompressed condition.

While the valving and pneumatic arrangement shown in the drawings has proved to be satisfactory, other types of air valving and air systems may be utilized. For example, the valving may be placed in the handle 31, as mentioned above. Also, while a pneumatic cylinder system has been shown, the system may also be hydraulic.

It has been found that the dual cylinder arrangement, namely the cylinders 23 and 24, provide a device which greatly reduces torquing of the shoes 17 and 18 to apply a correct application of force to the spring 14. This insures a safer tool for a mechanic to use as compared to many prior art tools. The tool 10, according to the present invention, greatly reduces the time involved in servicing MacPherson type independent suspension systems. Also, it encourages the mechanic to service the individual components of the system rather than replacing the entire MacPherson strut assembly thereby saving the consumer both labor costs and material costs.

The specific tool and components herein illustrated and described are intended to be representative only, as certain changes may be made therein without departing from the teachings of the disclosure. Accordingly, reference should be made to the following claims in determining the scope of the present invention.

What I claim is:

1. A spring compressor tool for compressing a spring having opposed ends comprising, an upper pressure shoe having a generally U-shaped helical portion including walls defining a spring receiving channel, a lower pressure shoe having a generally U-shaped helical portion including walls defining a spring receiving channel, a pair of fluid cylinders positioned between said upper and lower shoes, a pair of telescoping sleeves surrounding an end of each of said fluid cylinders and connected to one of such shoes, each of said cylinders including a cylinder body, a piston positioned to slide within said body, a piston rod attached to said piston and extending through one of said telescoping sleeves, and a cap connected to one end of the cylinder body, said cap defining therethrough a bore for slidably receiving said piston rod, said cap and said piston defining a chamber, a fluid header assembly positioned adjacent said telescoping sleeve, said fluid header assembly defining an inlet air passageway connected to said chambers and a vent passageway connected to said chambers, valving means for supplying air to said inlet air passageway and for venting said vent passageway to atmosphere, and spring return means positioned within said sleeves for urging said shoes apart.

2. A spring compressor tool, according to claim 1, wherein said fluid cylinders are pneumatic cylinders.

3. A spring compressor tool, according to claim 1, wherein each of said piston rods defines a longitudinally extending air passageway and wherein said piston rod passageways connect said inlet air passageway and said chambers, whereby actuation of said valving means supplies air under pressure to said chamber thereby moving the upper and lower shoes together.

4. A spring compressor tool according to claim 3, wherein said spring return means comprises a spring surrounding at least one of said piston rods and positioned within said telescoping sleeve.

5. A spring compressor tool according to claim 4, wherein each fluid cylinder includes sealing means between said cap and said piston rod for retarding the passage of air from such chamber.

6. A spring compressor tool according to claim 4, wherein said valving means comprises a normally closed valve in communication with such inlet air passageway, said valve having a valve actuator and a valve arm adjacent said actuator for engaging such actuator and opening said valve, whereby, when said valve is actuated, air under pressure is supplied through the said valve, such air passageway and such piston rod passageways to such chambers.

7. A spring compressor tool, according to claim 6, wherein a vent fitting is mounted on said fluid header assembly in communication with such vent passageway and wherein said valving means includes a second normally closed valve in communication with such vent passageway, said second valve having a valve actuator and a valve arm adjacent said actuator for engaging said actuator and opening said second valve, whereby, when said second valve is actuated, air under pressure in such chambers is vented through said piston rod passageways, such vent passageway and said vent fitting to atmosphere.

8. A spring compressor tool, according to claim 7, including a handle connected adjacent said sleeves.

9. A portable spring compressor tool for compressing in situs a loaded spring having opposed ends, comprising, a first pressure shoe having a generally U-shaped helical portion, said helical portion having inner and outer walls defining a continuous first channel which extends at least 180°, said first channel receiving a coil of such loaded spring at a position intermediate such opposed ends, a second pressure shoe spaced from said first pressure shoe, said second pressure shoe having a helical portion having inner and outer walls defining a continuous second channel receiving another coil of such loaded spring at a position intermediate such opposed ends, at least one fluid cylinder including a cylinder body, a piston positioned to slide within said cylinder body and a piston rod attached to said piston, means limiting said piston rod to linear movement as said attached piston is moved in said cylinder body, said cylinder body and said piston defining a fluid chamber, means attaching said first shoe to said piston rod, means attaching said second shoe to said cylinder body, means for supplying pressurized fluid to said fluid chamber to move said piston in said cylinder body, said first shoe moving toward said second shoe along a linear path to compress such spring as such pressurized fluid moves said piston, means for venting fluid from said fluid chamber, and return means for urging said first and second shoes apart whereby said spring is compressed without removing such spring from place.

10. A portable spring compressor tool, according to claim 9, wherein a pair of said fluid cylinders are connected in parallel between said first and second shoes, wherein a pair of telescoping sleeves surrounds said cylinders and are connected to said first pressure shoe, and wherein said fluid supplying means and said fluid venting means includes a fluid header assembly positioned adjacent said sleeve, said fluid header assembly defining an inlet air passageway and a vent passageway connected to said fluid chamber in each fluid cylinder, and valving means for supplying air to said inlet air passageway and for venting said vent passageway to atmosphere.

* * * * *